(12) United States Patent
Lee et al.

(10) Patent No.: US 11,686,977 B2
(45) Date of Patent: Jun. 27, 2023

(54) RETARDATION FILM FOR IPS MODE, POLARIZING PLATE COMPRISING SAME, AND LIQUID CRYSTAL DISPLAY DEVICE COMPRISING SAME

(71) Applicant: Samsung SDI Co., Ltd., Yongin-si (KR)

(72) Inventors: Sang Hum Lee, Suwon-si (KR); Kyung Il Sul, Suwon-si (KR); Jung Hun You, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 16/764,661

(22) PCT Filed: Nov. 16, 2018

(86) PCT No.: PCT/KR2018/014117
§ 371 (c)(1),
(2) Date: May 15, 2020

(87) PCT Pub. No.: WO2019/124752
PCT Pub. Date: Jun. 27, 2019

(65) Prior Publication Data
US 2020/0285094 A1    Sep. 10, 2020

(30) Foreign Application Priority Data
Dec. 22, 2017    (KR) .................. 10-2017-0178862

(51) Int. Cl.
*G02F 1/13363*    (2006.01)
*C08J 5/18*    (2006.01)
(Continued)

(52) U.S. Cl.
CPC .......... *G02F 1/133634* (2013.01); *C08J 5/18* (2013.01); *G02F 1/13363* (2013.01);
(Continued)

(58) Field of Classification Search
CPC .......... G02F 1/13363; G02F 1/133634; G02F 1/133637; G02F 1/133528;
(Continued)

(56) References Cited

U.S. PATENT DOCUMENTS

| | | | |
|---|---|---|---|
| 2007/0076155 A1* | 4/2007 | Nakayama | ............... C08B 3/00 349/118 |
| 2009/0040454 A1* | 2/2009 | Ichihashi | ............. G02B 5/3083 349/193 |

(Continued)

FOREIGN PATENT DOCUMENTS

| | | |
|---|---|---|
| CN | 1967288 A | 5/2007 |
| CN | 104345368 | 2/2015 |

(Continued)

OTHER PUBLICATIONS

Chinese Office Action from corresponding Chinese Patent Application No. 201880081824.2, Chinese Office Action dated Sep. 3, 2021 (6 pgs.).

(Continued)

*Primary Examiner* — Sophie Hon
(74) *Attorney, Agent, or Firm* — Lewis Roca Rothgerber Christie LLP

(57) ABSTRACT

Disclosed herein are a retardation film for IPS mode, a polarizing plate including the same, and a liquid crystal display including the same. The retardation film for IPS mode has an out-of-plane retardation at a wavelength of 450 nm (Rth (450)) of about −80 nm to 0 nm, an out-of-plane retardation at a wavelength of 550 nm (Rth (550)) of about −60 nm to 10 nm, an out-of-plane retardation at a wavelength of 650 nm (Rth (650)) of about −60 nm to 10 nm, and an in-plane retardation (Re) at a wavelength of 550 nm of about 0 nm to 10 nm.

16 Claims, 1 Drawing Sheet

(51) Int. Cl.
*G02F 1/1335* (2006.01)
*G02F 1/1343* (2006.01)

(52) U.S. Cl.
CPC ..... *G02F 1/133528* (2013.01); *C08J 2301/08* (2013.01); *C08J 2333/08* (2013.01); *C09K 2323/03* (2020.08); *C09K 2323/035* (2020.08); *G02F 1/133637* (2021.01); *G02F 1/134363* (2013.01)

(58) Field of Classification Search
CPC ... G02F 1/134363; G02B 5/30; G02B 5/3083; C09K 2323/03; C09K 2323/035
See application file for complete search history.

(56) References Cited

U.S. PATENT DOCUMENTS

| | | | | |
|---|---|---|---|---|
| 2009/0122243 | A1* | 5/2009 | Sugiyama | G02B 5/3033 |
| | | | | 349/118 |
| 2014/0377528 | A1 | 12/2014 | Nakayama et al. | |
| 2015/0042942 | A1* | 2/2015 | Hatanaka | G02B 5/3016 |
| | | | | 349/194 |
| 2015/0131031 | A1* | 5/2015 | Kim | G02B 5/3016 |
| | | | | 349/75 |
| 2016/0025913 | A1* | 1/2016 | Oh | G02B 5/3083 |
| | | | | 359/487.02 |

FOREIGN PATENT DOCUMENTS

| | | | | |
|---|---|---|---|---|
| CN | 111492277 | B * | 10/2022 | ............ C08J 5/18 |
| JP | 2007-58165 | A | 3/2007 | |
| JP | 2008-102189 | A | 5/2008 | |
| JP | 2017-182058 | A | 10/2017 | |
| KR | 10-1311919 | B | 9/2013 | |
| KR | 101311919 | B1 * | 9/2013 | ............ G02B 5/30 |
| KR | 10-2015-0018436 | A | 2/2015 | |
| KR | 10-2017-0121987 | A | 11/2017 | |
| KR | 102137551 | B1 * | 7/2020 | ............ C08J 5/18 |
| TW | I699591 | B * | 7/2020 | ............ C08J 5/18 |

OTHER PUBLICATIONS

Chinese Office action dated May 7, 2022 issued in corresponding CN Application No. 201880081824.2, 6 pages.

* cited by examiner

RETARDATION FILM FOR IPS MODE, POLARIZING PLATE COMPRISING SAME, AND LIQUID CRYSTAL DISPLAY DEVICE COMPRISING SAME

CROSS-REFERENCE TO RELATED APPLICATIONS

This application is a U.S. National Phase Patent Application of International Application Number PCT/KR2018/014117, filed on Nov. 16, 2018, which claims priority to Korean Patent Application Number 10-2017-0178862, filed on Dec. 22, 2017, the entire contents of both of which are incorporated herein by reference.

TECHNICAL FIELD

The present invention relates to a retardation film for IPS mode, a polarizing plate including the same, and a liquid crystal display including the same. More specifically, the present invention relates to a retardation film for IPS mode which can compensate for visibility degradation on the right and left sides of a liquid crystal display in an IPS mode while reducing visibility difference between the right and left sides, and a polarizing plate including the same, and a liquid crystal display including the same.

BACKGROUND ART

Liquid crystal displays are the most widely used flat panel displays at present. However, a liquid crystal display has a fundamental problem of visibility difference between the right and left sides due to refractive-index anisotropy of a liquid crystal.

Specifically, in an in-plane switching (IPS) mode liquid crystal display, a liquid crystal is obliquely oriented in the z-axis direction due to a pretilt angle in the rubbing direction of the liquid crystal. Generally, such an IPS mode liquid crystal display uses a zero-retardation film rather than a retardation film. Thus, the IPS mode liquid crystal display suffers from light leakage on 45-degree diagonally opposite sides thereof.

Here, one of the opposite sides suffering from light leakage is a bluish region, whereas the other side is a yellowish region. Such a visibility difference between the opposite sides can cause reduction in image display quality of the display. Specifically, visibility difference between the right and left sides in a diagonal direction becomes larger with increasing screen size of a liquid crystal display. Therefore, there is a need for a retardation film which can eliminate visibility difference of an IPS mode liquid crystal display.

The background technique of the present invention is disclosed in Japanese Unexamined Patent Publication No. 2017-182058 and the like.

DISCLOSURE

Technical Problem

It is one aspect of the present invention to provide a retardation film for IPS mode which can compensate for visibility difference or color difference between the right and left sides of an IPS mode liquid crystal display when used in the liquid crystal display.

It is another aspect of the present invention to provide a retardation film for IPS mode which can reduce visibility difference or color difference between the right and left sides of an IPS mode liquid crystal display while preventing difference in degree of diagonal light leakage when used in the liquid crystal display.

In accordance with one aspect of the present invention, there is provided a retardation film for IPS mode having an out-of-plane retardation at a wavelength of 450 nm (Rth (450)) of −80 nm to 0 nm, an out-of-plane retardation at a wavelength of 550 nm (Rth (550)) of −60 nm to 10 nm, an out-of-plane retardation at a wavelength of 650 nm (Rth (650)) of −60 nm to 10 nm, and an in-plane retardation (Re) at a wavelength of 550 nm of 0 nm to 10 nm.

In accordance with another aspect of the present invention, there is provided a polarizing plate including the retardation film for IPS mode according to the present invention.

In accordance with a further aspect of the present invention, there is provided a liquid crystal display including the polarizing plate according to the present invention.

Advantageous Effects

The present invention provides a retardation film for IPS mode which can compensate for visibility difference or color difference between the right and left sides of an IPS mode liquid crystal display when used in the liquid crystal display.

The present invention provides a retardation film for IPS mode which can reduce visibility difference or color difference between the right and left sides of an IPS mode liquid crystal display while preventing difference in degree of diagonal light leakage when used in the liquid crystal display.

BEST MODE

Figure 1:
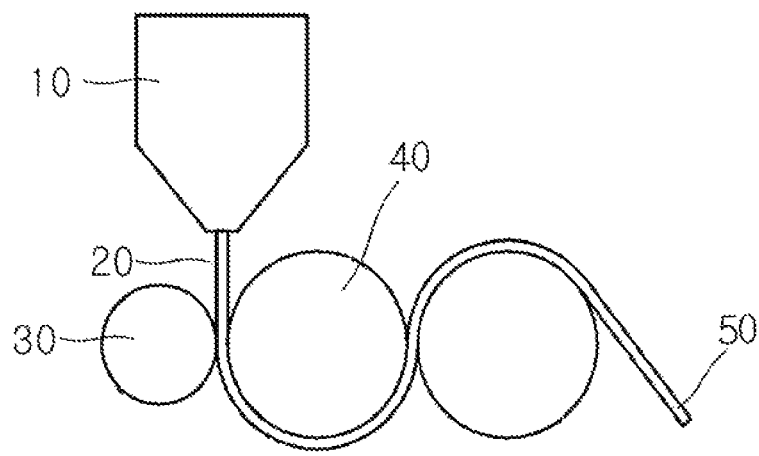
FIG. 1 is a schematic view of a process of fabricating a retardation film according to one embodiment of the present invention.

Embodiments of the present invention will be described in detail with reference to the accompanying drawings to provide thorough understanding of the invention to those skilled in the art. It should be understood that the present invention may be embodied in different ways and is not limited to the following embodiments. In the drawings, portions irrelevant to the description will be omitted for clarity.

Herein, "in-plane retardation (Re)" is measured at a wavelength of 550 nm and is represented by Equation A:

$$Re = (nx - ny) \times d \qquad \text{<Equation A>}$$

(In equation A, wherein nx and ny are indices of refraction in the x-axis and y-axis directions of a retardation film at a wavelength of 550 nm, respectively, and d is a thickness of the retardation film (unit: nm)).

Herein, "out-of-plane retardation (Rth)" is measured at measurement wavelengths of 450 nm, 550 nm, and 650 nm and is represented by Equation B:

$$Rth = ((nx + ny)/2 - nz) \times d \qquad \text{<Equation B>}$$

(In equation B, wherein nx, ny and nz are indices of refraction in the x-axis, y-axis and z-axis directions of a retardation film at each of the measurement wavelengths, respectively, and d is a thickness of the retardation film (unit: nm)).

Herein, "(φ, θ)" represents the location of a point in a spherical coordinate system, wherein the front is indicated by (0°, 0°) and the side is indicated by (45°, 60°) or (135°, 60°).

In an IPS mode liquid crystal display, since a liquid crystal is obliquely oriented in the z-axis direction due to a pretilt angle of the liquid crystal in the rubbing direction of an alignment layer, when viewed from diagonally opposite sides of a screen of the display, the display looks bluish at one side and looks yellowish at the other side, causing difference in color and/or visibility between the right and left sides. The present inventors found that a retardation film having an in-plane retardation (Re) at a wavelength of 550 nm of about 0 nm to 10 nm, an out-of-plane retardation at a wavelength of 450 nm (Rth (450)) of about −80 nm to 0 nm, an out-of-plane retardation at a wavelength of 550 nm (Rth (550)) of about −60 nm to 10 nm, and an out-of-plane retardation at a wavelength of 650 nm (Rth (650)) of about −60 nm to 10 nm can reduce such a difference in visibility and/or color of an IPS mode liquid crystal display, and thus completed the present invention.

Preferably, the retardation film has an Re of about 0 nm to 5 nm at a wavelength of 550 nm. Preferably, the retardation film has an Rth (450) of about −70 nm to −5 nm. Preferably, the retardation film has an Rth (550) of about −60 nm to 5 nm. Preferably, the retardation film has an Rth (650) of about −60 nm to 5 nm.

The retardation film may have a thickness of about 5 μm to 200 μm, specifically about 30 μm to 120 μm. Within this range, the retardation film can be used in a liquid crystal display.

The retardation film may be formed of an optically transparent polymer resin or a liquid crystal.

The optically transparent polymer resin is a non-liquid crystalline resin and may include, for example, at least one of cellulose ester resins including triacetyl cellulose (TAC), cyclic polyolefin resins including amorphous cyclic polyolefin (COP), polycarbonate (PC) resins, polyester resins including polyethylene terephthalate (PET), acrylic resins, polyether sulfone resins, polysulfone resins, polyamide resins, polyimide resins, non-cyclic polyolefin resins, polyacrylate resins including polymethyl methacrylate resins, polyvinyl alcohol resins, polyvinyl chloride resins, and polyvinylidene chloride resins.

The liquid crystal may include a liquid crystal having a photosensitive reactive group. The liquid crystal having a photosensitive reactive group may include any known liquid crystal having a UV-curable photoreactive group.

Next, a retardation film for IPS mode according to one embodiment of the present invention will be described.

A retardation film according to this embodiment may have an Re of about 0 nm to 10 nm at a wavelength of 550 nm, an Rth (450) of about −80 nm to 0 nm, an Rth (550) of about −60 nm to 10 nm, and an Rth (650) of about −60 nm to 10 nm.

With regard to wavelength dispersion at wavelengths of 450 nm, 550 nm and 650 nm, the retardation film may satisfy Relation 1 and Relation 2:

$$Rth(450) < Rth(550) < Rth(650) \qquad \text{<Relation 1>}$$

$$0 \leq |Rth(450)|/|Rth(550)| \leq 8 \qquad \text{<Relation 2>}$$

In the retardation film, Rth at a wavelength of 550 nm is similar to Rth at a wavelength of 650 nm while Rth at a wavelength of 450 nm is much lower than Rth at wavelengths of 550 nm and 650 nm to induce a blue shift in a yellowish region, thereby eliminating the difference in visibility and color.

Preferably, in Relation 2, |Rth(450)|/|Rth(550)| ranges from about 0.1 to 8, from about 2 to 8, from about 3 to 8, from about 4 to 8, or from about 5 to 8. Within this range, the retardation film can be provided in film form and can minimize the difference in visibility or color without affecting forward visibility.

Preferably, the retardation film has an Rth (450) of about −70 nm to 5 nm, more preferably about −50 nm to −5 nm. Preferably, the retardation film has an Rth (550) of about −50 nm to 0 nm, more preferably about −10 nm to 0 nm. Preferably, the retardation film has an Rth (650) of about −45 nm to 5 nm, more preferably about −1 nm to 5 nm. Within these ranges, the retardation film can reduce the difference in visibility or color, provided that the retardation film satisfies Relations 1 and 2.

In one embodiment, the retardation film may satisfy Relation 3:

$$0 \leq |Rth(650)|/|Rth(550)| \leq 6 \qquad \text{<Relation 3>}$$

Within this range of Relation 3, the retardation film can control color change in wavelength ranges other than the blue region. For example, in Relation 3, |Rth(650)|/|Rth(550)| may range from about 0 to 5, from about 0 to 2, or from about 0 to 1.

In one embodiment, the retardation film may be formed of a cellulose ester resin such as triacetyl cellulose (TAC).

Next, a retardation film according to another embodiment of the present invention will be described.

A retardation film according to this embodiment may have an Re of about 0 nm to 10 nm at a wavelength of 550 nm, and an Rth (450) of about −80 nm to 0 nm, an Rth (550) of about −60 nm to 10 nm, and an Rth (650) of about −60 nm to 10 nm. In addition, with regard to wavelength dispersion, the retardation film may satisfy Relations 1, 2 and 3.

Since values of Rth at wavelengths of 550 nm, 650 nm, 450 nm of the retardation film are similar to one another, the retardation film exhibits flat wavelength dispersion. In addition, the retardation film according to this embodiment is reduced in Rth at a wavelength of 450 nm to induce a blue shift in a yellowish region, thereby eliminating the difference in color or visibility while providing color balance between the right and left sides of a liquid crystal display.

Preferably, in Relation 2, |Rth (450)|/|Rth (550)| ranges from about 0.1 to 8, from about 0 to 3, from about 0 to less than 2, or from about 0 to 1.9. Preferably, in Relation 3, |Rth (650)|/|Rth (550)| ranges from about 0 to 5 or from about 0 to 2. Within these ranges, the retardation film can be provided in film form and can minimize the difference in visibility or color without affecting forward visibility.

Preferably, the retardation film according to this embodiment has an Rth (450) of about −70 nm to −5 nm or about −60 nm to −5 nm. Preferably, the retardation film has an Rth (550) of about −60 nm to −10 nm, more preferably about −60 nm to −20 nm. Preferably, the retardation film has an Rth (650) of about −60 nm to 5 nm or about −60 nm to 0 nm, more preferably about −60 nm to −20 nm. Within these ranges, the retardation film can reduce the difference in visibility or color while providing color balance between the right and left sides, provided that the retardation film satisfies Relations 1, 2, and 3.

In one embodiment, the retardation film may satisfy Relation 1-1:

$$Rth(450) < Rth(550) < Rth(650) \leq 0 \qquad \text{<Relation 1-1>}$$

Within this range, the retardation film can further provide improvement in visibility.

In one embodiment, the retardation film may be formed of a polycarbonate (PC) resin, a cyclic polyolefin (COP) resin, an acrylic resin, or the like.

Next, a retardation film fabrication method according to one embodiment of the present invention will be described.

A retardation film according to the present invention may be fabricated by any known method capable of adjusting Rth of the retardation film. For example, a non-oriented film is prepared by any suitable film formation method such as solution casting, melt extrusion, calendaring, and compression molding. Specifically, solution casting or melt extrusion is preferred. Examples of an apparatus for solution casting may include a drum casting machine, a band casting machine, and a spin coater. Examples of melt extrusion may include a T-die method and an inflation method.

The retardation film may be any one of a non-oriented film prepared by a method as set forth above or an oriented film obtained by stretching the non-oriented film. When the retardation film is an oriented film, the retardation film may be a uniaxially or biaxially oriented film. Preferably, the retardation film is a biaxially oriented film. Here, the MD elongation ratio may range from about 1 to 3.5 and the TD elongation ratio may range from about 1 to 3.5, without being limited thereto. In one embodiment, the desired values of Rth of the retardation film at wavelengths of 450 nm, 550 nm and 650 nm may be obtained by adjusting the thickness and elongation ratio of the non-oriented film or the oriented film. In addition, the stretching process may be performed at a temperature of about 60° C. to 200° C., for example, about 80° C. to 150° C. In biaxial stretching, a ratio of MD elongation to TD elongation may range from about 1:1.5 to 1:2, specifically about 1:1.

Next, a retardation film fabrication method according to another embodiment of the present invention will be described.

A retardation film preparation method according to this embodiment may include: subjecting a non-liquid crystalline resin to melt extrusion; and forming the melt-extruded resin into a film by forcing the resin to pass between a first cooling roll and a second cooling roll, wherein a difference in peripheral speed between the first coiling roll and the second coiling roll is adjusted.

FIG. 1 is a schematic view of a process of preparing a retardation film according to this embodiment of the invention. Referring to FIG. 1, a resin 20 melt-extruded through a die 10 passes between the first cooling roll 30 and the second cooling roll 40 to be formed into a film 50. Here, the second coiling roll 40 is a roll around which the melt extruded resin 20 is wound.

In this way, when the melt extruded resin 20 is brought into contact with the first coiling roll 30 and the second coiling roll 40 to be formed into a film, the internal temperature of the film exceeds a glass transition temperature of the film, whereas the surface temperature of the film is lower than the glass transition temperature, that is, there is a difference between the internal temperature and the surface temperature of the film. When the rolls at both ends of the film are driven at different forming temperatures at the surface and interior of the film, different shear forces are generated at the surface and interior of the film, respectively, whereby the film can be tilted at a certain angle in the thickness direction.

Figure 2:
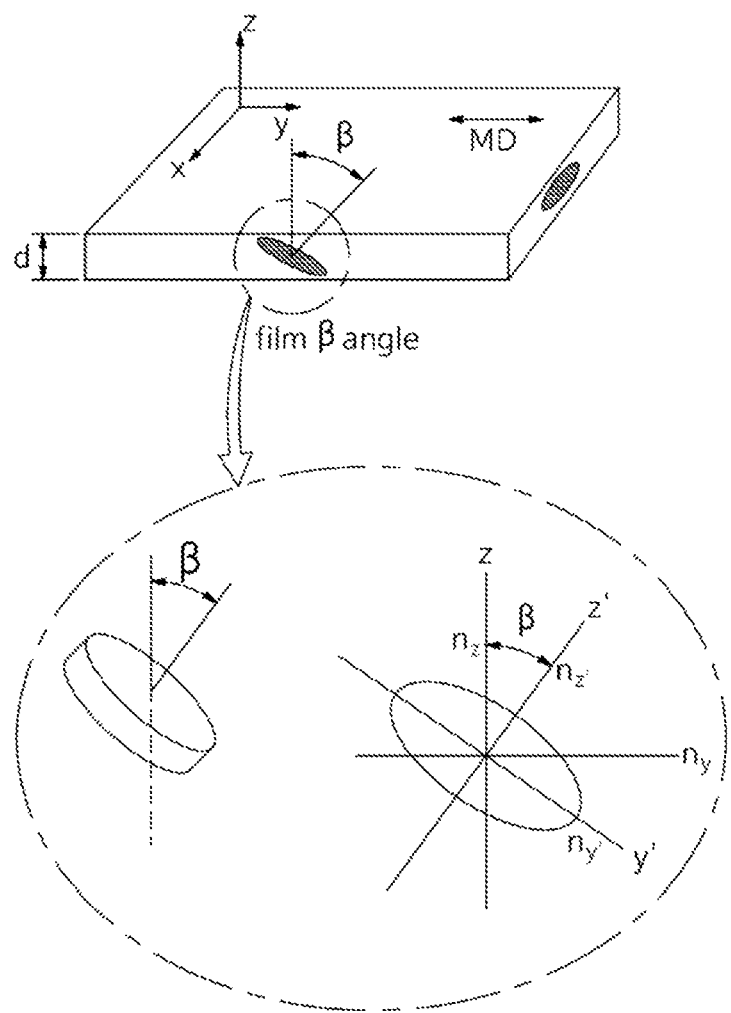
FIG. 2 is a conceptual view illustrating a film β angle of a retardation film.

In one embodiment, the film may have a film β angle of 0° to 25° by adjusting the peripheral speeds of the first cooling roll and the second cooling roll. FIG. 2 is a conceptual view illustrating a film β angle. Here, the film β angle is identical to the slice orientation angle and is an angle formed between the z-axis, i.e., a thickness direction, and the z'-axis, i.e., a perpendicular direction with respect to an orientation plane, as shown in FIG. 2. In addition, the film β angle may be defined as an angle at which the transmittance under crossed nicols has a minimum value when observing crossed nicols after placing the film between polarizing plates. Within this range of film β angle, the film can directly compensate for the pretilt angle of a liquid crystal panel, thereby providing control over the color shift. For example, the first cooling roll 30 may be driven at a higher speed than that of the second cooling roll 40. Specifically, the first cooling roll 30 may be driven at a speed of about 0.9 to 1.2 times, for example, about 1.05 to 1.2 times, that of the second cooling roll 40.

The method may further include stretching the resin film having passed between the first cooling roll and the second cooling roll. Specifically, the resin film may be obliquely stretched to 1 to 3 times an initial length thereof in the MD or TD. Within this range, the desired values of Rth at wavelengths of 450 nm, 550 nm, and 650 nm can be secured. Preferably, the stretching process is performed at a temperature below the glass transition temperature of the resin. For example, the stretching process may be performed at a temperature which is about 1° C. to 20° C. lower, for example, about 5° C. to 15° C. lower temperature, than the glass transition temperature of the resin. Within this range, the film can provide increase in contrast ratio.

In one embodiment, the first and second cooling rolls may be provided in various combinations, such as a rubber roll+an FSR roll, an FSR roll+an FSR roll, an SFR roll+an FSR roll, a metal roll+an FSR roll, an SFR roll+an SFR roll, and a metal roll+a rubber roll. Here, the FSR roll may refer to a roll having a structure in which a water layer and a steel layer are sequentially formed on a surface of a metal roll and the SFR roll may refer to a roll having a structure in which a rubber layer and a steel layer are sequentially formed on a surface of a metal roll.

In one embodiment, the resin film may be formed of a polycarbonate (PC) resin, a cyclic polyolefin (COP) resin, an acrylic resin, or the like.

Next, a retardation film preparation method according to a further embodiment of the present invention will be described.

In this embodiment, a retardation film is prepared through a process in which a retardation film composition including liquid crystals having a photosensitive reactive group is applied to a base material, followed by drying, and the dried composition is irradiated with polarized UV light to control a liquid crystal orientation to secure the desired values of Rth at wavelengths of 450 nm, 550 nm, and 650 nm.

Next, a polarizing plate according to the present invention will be described.

A polarizing plate according to the present invention may include: a polarizer; a retardation film formed on a light incident surface of the polarizer; and a polarizer protective film formed on a light exit surface of the polarizer, wherein the retardation film is the retardation film for IPS mode according to the present invention. When used in an IPS mode liquid crystal display, the polarizing plate including the retardation film for IPS mode according to the present invention can reduce visibility difference and color difference between the right and left sides of the liquid crystal display. The polarizing plate may be used as a viewer-side polarizing plate of the liquid crystal display.

The polarizer may include a polyvinyl alcohol-based polarizer obtained by dyeing a polyvinyl alcohol film with iodine or a polyene-based polarizer obtained by dehydrating a polyvinyl alcohol film. The polarizer may have a thickness of about 5 µm to 50 µm. Within this range, the polarizer can be used in an optical display. The polarizer protective film may include a film formed of the optically transparent resin set forth above or a film formed of the liquid crystal set forth above.

In one embodiment, with the angle between the absorption axis of the polarizer and the slow axis of the retardation film set to about 90°±5° or about 180°±5°, the polarizing plate can compensate for visibility difference and color difference between a yellowish region and a bluish region at respective diagonally opposite sides of the IPS mode display, provided that the retardation film for IPS mode according to the invention has a film β angle within the range set forth herein.

Next, a liquid crystal display according to the present invention will be described.

A liquid crystal display according to the present invention may include: a liquid crystal panel, a viewer-side polarizing plate formed on one surface of the liquid crystal panel, and a light source-side polarizing plate formed on the other surface of the liquid crystal panel. Here, at least one of the viewer-side polarizing plate and the light source-side polarizing plate may be the polarizing plate including the retardation film for IPS mode according to the present invention. Herein, the light source-side polarizing plate refers to a polarizing plate disposed between a backlight unit and the liquid crystal panel. The viewer-side polarizing plate refers to a polarizing plate at the side of a viewer, that is, a polarizing plate opposite the light source-side polarizing plate.

The liquid crystal panel is driven in an IPS mode and may include commonly known components such as a substrate, a liquid crystal layer, and the like.

In one embodiment, both the viewer-side polarizing plate and the light source-side polarizing plate may include a polarizing plate including the retardation film for IPS mode according to the present invention. Here, the retardation film for IPS mode of the viewer-side polarizing plate has a greater absolute value of Rth value among at least one wavelengths of 450 nm, 550 nm, and 650 nm. In this way, it is possible to further compensate for visibility difference and color difference between the right and left sides of the IPS mode liquid crystal display.

In another embodiment, both the viewer-side polarizing plate and the light source-side polarizing plate may include the polarizing plate including the retardation film for IPS mode according to the present invention. Here, the sum of Rth values at a wavelength of 450 nm of respective retardation films of the viewer-side polarizing plate and the light source-side polarizing plate may range from about −80 nm to 0 nm. In addition, the sum of Rth values at a wavelength of 550 nm of respective retardation films of the viewer-side polarizing plate and the light source-side polarizing plate may range from about −60 nm to 10 nm. Further, the sum of Rth values at a wavelength of 650 nm of respective retardation films of the viewer-side polarizing plate and the light source-side polarizing plate may range from about −60 nm to 10 nm. In this way, it is possible to further compensate for visibility difference and color difference between the right and left sides of the IPS mode liquid crystal display.

Next, the present invention will be described in more detail with reference to some examples. However, it should be noted that these examples are provided for illustration only and are not to be construed in any way as limiting the present invention.

Example 1

A non-oriented acrylic resin film (thickness: 160 µm) prepared by melt extrusion was biaxially stretched to 2 times an initial length thereof in the MD and TD at 135° C., thereby preparing a retardation film having a thickness of 40 µm and retardation values listed in Table 1. Here, retardation values at wavelengths of 450 nm, 550 nm, and 650 nm of the retardation film were measured using an AxoScan polarimeter.

Example 2

A non-oriented acrylic resin film (thickness: 200 µm) prepared by melt extrusion was biaxially stretched to 3 times an initial length thereof in the MD and TD at 135° C., thereby preparing a retardation film having a thickness of 40 µm and retardation values listed in Table 1.

Example 3

A non-oriented triacetyl cellulose resin film (Z-TAC, Konica Minolta, Inc., thickness: 200 µm) prepared by solution casting was biaxially stretched to 1.2 times an initial length thereof in the MD and TD at 100° C., thereby preparing a retardation film having a thickness of 35 µm and retardation values listed in Table 1.

Example 4

A non-oriented triacetyl cellulose resin film (Z-TAC, Konica Minolta, Inc., thickness: 40 µm) prepared by solution casting was biaxially stretched to 1.05 times an initial length thereof in the MD and TD at 100° C., thereby preparing a retardation film having a thickness of 38 µm and retardation values listed in Table 1.

Comparative Example 1

A non-oriented acrylic resin film (thickness: 250 µm) prepared by melt extrusion was biaxially stretched to 4 times an initial length thereof in the MD and TD at 135° C., thereby preparing a retardation film having a thickness of 40 µm and retardation values listed in Table 1.

Comparative Example 2

A cyclic polyolefin (COP) resin (JSR Corporation) prepared by melt extrusion was melt-extruded through a T-die at a temperature of 130° C. to 150° C. and then was forced to pass between an FSR roll (a first cooling roll) and a metal roll (a second cooling roll) to be formed into a film. As a result, a retardation film having a thickness of 40 µm and retardation values listed in Table 1 was obtained.

A polarizing plate was prepared using each of the retardation films prepared in Examples and Comparative Examples, followed by evaluation of color coordinates x and y, as a color shift shown in Table 1.

A polarizer was fabricated by stretching a polyvinyl alcohol film at 60° C. to 3 times an initial length thereof and adsorbing iodine to the stretched film, followed by stretching the film to 2.5 times the stretched length of the film in an aqueous solution of boric acid at 40° C. A viewer-side polarizing plate was prepared by attaching each of the retardation films prepared in Examples and Comparative Examples to a light incident surface of the polarizer using a bonding agent and a polyethylene terephthalate film (Toyobo Co., Ltd.) to a light exit surface of the polarizer using a bonding agent. A light source-side polarizing plate was prepared by attaching a triacetyl cellulose film (Konica Minolta, Inc.) to both surfaces of a polarizer prepared in the same manner as above using a bonding agent. The viewer-side polarizing plate was laminated on a viewer-side surface of an IPS panel and the light source-side polarizing plate was laminated on a light source-side surface of the IPS panel.

Color coordinates x and y, as a color shift value, were measured in a black mode at coordinates (φ, θ) in a spherical coordinate system corresponding to diagonally opposite sides, that is, at coordinates (45°, 60°) and coordinates (135°, 60°), using an EZ contrast system. A lower value of each of the color coordinates x and y at coordinates (45°, 60°) indicates a smaller difference in visibility between the right and left sides. A lower value of each of the color coordinates x and y at coordinates (135°, 60°) indicates a lower difference in visibility between the right and left sides. In addition, when each of the color coordinates x and y has a lower value at coordinates (45°, 60°) than at coordinates (135°, 60°), the visibility difference is further reduced.

TABLE 1

|  |  | Example | | | | Comparative Example | |
| --- | --- | --- | --- | --- | --- | --- | --- |
|  |  | 1 | 2 | 3 | 4 | 1 | 2 |
| Rth (450) (nm) | | −60 | −33 | −30 | −7 | −90 | 15 |
| Rth (550) (nm) | | −58 | −32 | −4 | −2 | −89 | 15 |
| Rth (650) (nm) | | −56 | −31 | 2 | −1 | −86 | 15 |
| Re (550) (nm) | | 3.0 | 2.0 | 1.2 | 0.9 | 4.0 | 2.0 |
| \| Rth(450) \|/\| Rth(550) \| | | 1.03 | 1.03 | 7.5 | 3.5 | 1.01 | 1 |
| \| Rth(650) \|/\| Rth(550) \| | | 0.97 | 0.97 | 0.5 | 0.5 | 0.97 | 1 |
| Color | (45°, 60°) | 0.2442 | 0.2540 | 0.2622 | 0.3002 | 0.2410 | 0.3210 |
| coordinate x | (135°, 60°) | 0.2447 | 0.2430 | 0.2313 | 0.2427 | 0.2328 | 0.2530 |
| Color | (45°, 60°) | 0.2883 | 0.2769 | 0.2670 | 0.3104 | 0.3010 | 0.3310 |
| coordinate y | (135°, 60°) | 0.2901 | 0.2790 | 0.2280 | 0.2323 | 0.3090 | 0.2580 |

As shown in Table 1, the retardation film for IPS mode according to the present invention could provide reduced values of color coordinates x and y at each of coordinates (45°, 60°) and coordinates (135°, 60°), thereby compensating for visibility difference and color difference between the right and left sides.

Conversely, the retardation film of Comparative Example 2 having Rth values outside the range set forth herein exhibited lower values of color coordinates x and y at each of coordinates (45°, 60°) and coordinates (135°, 60°) and thus provided poorer compensation for visibility difference than the retardation films of Examples. In addition, the retardation film of Comparative Example 1 having Rth values outside the range set forth herein exhibited an excessively high value of color coordinate y at coordinates (135°, 60°), causing generation of greenish color, excessive light leakage, and color shift in an undesirable direction.

It should be understood that various modifications, changes, alterations, and equivalent embodiments can be made by those skilled in the art without departing from the spirit and scope of the invention.

The invention claimed is:

1. A retardation film for IPS mode, wherein:
the retardation film has an out-of-plane retardation at a wavelength of 450 nm (Rth (450)) of about −30 nm to 0 nm, an out-of-plane retardation at a wavelength of 550 nm (Rth (550)) of about −10 nm to 0 nm, an out-of-plane retardation at a wavelength of 650 nm (Rth (650)) of about −5 nm to 10 nm, and an in-plane retardation (Re) at a wavelength of 550 nm of about 0 nm to 10 nm, and
wherein Rth (450) is less than Rth (550), |Rth(450)|/|Rth (550)| is from about 3 to 8, and |Rth(650)|/|Rth(550)| is about 0 to 2.

2. The retardation film according to claim 1, wherein Rth (450) is about −30 nm to −5 nm, Rth (550) is about −10 nm to less than 0 nm, and Rth (650) is about −5 nm to 5 nm.

3. The retardation film according to claim 1, wherein the retardation film is a cellulose ester resin film.

4. The retardation film according to claim 1, wherein the retardation film has a film β angle of about 0° to 25°, the film β angle being defined as an angle formed between an axis extending in a thickness direction of the retardation film and an axis that is perpendicular to an orientation plane of the retardation film.

5. The retardation film according to claim 1, wherein the retardation film is a polymer resin film or a liquid crystal film.

6. The retardation film according to claim 1, wherein the retardation film has a thickness of about 5 μm to 200 μm.

7. A polarizing plate comprising:
a polarizer; and
a retardation film formed on at least one surface of the polarizer,
wherein the retardation film is the retardation film for IPS mode according to claim 1.

8. The polarizing plate according to claim 7, wherein an angle between an absorption axis of the polarizer and a slow axis of the retardation film is about 90°±5° or about 180°±5°.

9. The polarizing plate according to claim 7, wherein the retardation film is formed on a light incident surface of the polarizer.

10. The polarizing plate according to claim 9, further comprising a polarizer protective film formed on a light exit surface of the polarizer.

11. An IPS mode liquid crystal display comprising the polarizing plate according to claim 7.

12. The retardation film according to claim 1, wherein Rth (550) is less than Rth (650).

13. The retardation film according to claim 12, wherein Rth (650)| is about −5 nm to less than or equal to 0 nm.

14. A retardation film for IPS mode, wherein:
the retardation film has an out-of-plane retardation at a wavelength of 450 nm (Rth (450)) of about −80 nm to −33 nm, an out-of-plane retardation at a wavelength of 550 nm (Rth (550)) of about −60 nm to −32 nm, an out-of-plane retardation at a wavelength of 650 nm (Rth (650)) of about −60 nm to −31 nm, and an in-plane retardation (Re) at a wavelength of 550 nm of about 0 nm to 10 nm, and wherein Rth (450) is less than Rth (550), |Rth(450)|/|Rth (550)| is greater than 0 to less than or equal to 2, and |Rth(650)|/|Rth(550)| is greater than 0 to less than or equal to 2.

15. The retardation film according to claim 14, wherein |Rth(450)|/|Rth(550)| ranges from greater than 0 to less than 2 and |Rth(650)|/|Rth(550)| ranges from greater than 0 to less than or equal to 1.

16. The retardation film according to claim 14, wherein the retardation film is formed of at least one of a polycarbonate resin, a cyclic polyolefin resin, and an acrylic resin.

* * * * *